(12) United States Patent
Johnson et al.

(10) Patent No.: US 11,297,181 B2
(45) Date of Patent: Apr. 5, 2022

(54) DYNAMIC USER INTERFACE DURING A VOICE CALL SESSION

(71) Applicant: Toshiba Global Commerce Solutions Holdings Corporation, Tokyo (JP)

(72) Inventors: Brad M. Johnson, Raleigh, NC (US); Adrian X. Rodriguez, Durham, NC (US); David Steiner, Raleigh, NC (US); Neil A. Girard, Pittsboro, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 16/847,023

(22) Filed: Apr. 13, 2020

(65) Prior Publication Data
US 2021/0320999 A1  Oct. 14, 2021

(51) Int. Cl.
| | |
|---|---|
| H04M 3/51 | (2006.01) |
| G06F 9/451 | (2018.01) |
| G10L 15/26 | (2006.01) |
| G06F 3/16 | (2006.01) |
| G06F 3/048 | (2013.01) |
| G06T 19/00 | (2011.01) |

(52) U.S. Cl.
CPC .......... *H04M 3/5141* (2013.01); *G06F 9/453* (2018.02); *G06T 19/006* (2013.01); *G10L 15/26* (2013.01); *H04M 3/5191* (2013.01)

(58) Field of Classification Search
CPC ... H04M 3/5141; H04M 3/5191; G10L 15/26; G06F 9/453

USPC ... 379/265.09, 88.01, 88.03, 265.05, 265.11, 379/265.01, 265.13
See application file for complete search history.

(56) References Cited

U.S. PATENT DOCUMENTS

| | | | |
|---|---|---|---|
| 6,868,140 | B2 | 3/2005 | Myers et al. |
| 2008/0255851 | A1 | 10/2008 | Ativanichayaphong et al. |
| 2011/0286586 | A1* | 11/2011 | Saylor .................... G06F 9/451 |
| | | | 379/88.13 |
| 2012/0265528 | A1 | 10/2012 | Gruber et al. |
| 2017/0140449 | A1* | 5/2017 | Kannan ................ G06Q 30/016 |
| 2018/0005631 | A1* | 1/2018 | Lee ......................... G06F 3/167 |

OTHER PUBLICATIONS

David Pasztor, "Combining Graphical and Voice Interfaces for a Better User Experience." Smashing Magazine Dated: Oct. 19, 2017.

* cited by examiner

*Primary Examiner* — Thjuan K Addy
(74) *Attorney, Agent, or Firm* — Patterson + Sheridan, LLP

(57) ABSTRACT

Method, computer program product, and system for augmenting a voice call with a user interface to provide a user visual access to a guided solution. The user interface is generated based on information such as a spoken language string received from a user using a user device with a display. The user interface including user interface elements for the guided solution is provided to the user via the display of the user device such that the user proceeds through the guided solution using the user interface during the voice call.

20 Claims, 9 Drawing Sheets

DYNAMIC USER INTERFACE DURING A VOICE CALL SESSION

BACKGROUND

Customer service phone calls are a common occurrence in modern life. Customers and other types of users frequently need help sorting through questions, troubleshooting problems, or just accessing various services offered by customer service providers (e.g., bank accounts, phone ordering, etc.). These service phone calls are often directed first to an automated voice or touch tone based system to attempt to help a caller navigate through a system to access resources and/or answer questions prior to connecting the caller to a live human operator or service agent.

These automated voice based systems can frequently frustrate a caller since the systems can be hard to access and navigate using voice or touch tone alone. Also, these systems frequently do not correctly diagnose or determine the purpose of the voice call and often end with a caller being placed in a queue to speak with an operator. The wait times in the queue to speak with the operator can also cause or increase frustration since a user is spending time waiting for an operator or service agent while continuing to not have his or her problem solved or question answered. The present invention relates to augmenting a voice call, such as a customer service call with a user interface.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example embodiment includes a method. The method includes receiving, during a voice call session, a spoken language string from a user, determining at least one keyword from the spoken language string, generating a user interface which includes at least one user interface element for a guided solution for the voice call session based on the at least one keyword, providing the user interface to the user to augment the voice call session, and guiding the user through the guided solution via the voice call session and the user interface. Other embodiments of this aspect include corresponding computer systems, apparatus, and computer programs recorded on one or more computer storage devices, each configured to perform the actions of the methods.

One example embodiment includes system. The system includes one or more computer processors and a memory containing program code which, when executed by the one or more computer processors, performs an operation. The operation may include: receiving, during a voice call session, a spoken language string from a user, determining at least one keyword from the spoken language string; generating a user interface which includes at least one user interface element for a guided solution for the voice call session based on the at least one keyword, providing the user interface to the user to augment the voice call session, and guiding the user through the guided solution via the voice call session and the user interface.

One example embodiment also includes a computer-readable storage medium having computer-readable program code embodied therewith, the computer-readable program code executable by one or more computer processors to perform an operation. The operation may include: receiving, during a voice call session, a spoken language string from a user, determining at least one keyword from the spoken language string, generating a user interface which includes at least one user interface element for a guided solution for the voice call session based on the at least one keyword, providing the user interface to the user to augment the voice call session, and guiding the user through the guided solution via the voice call session and the user interface.

Figure 1:
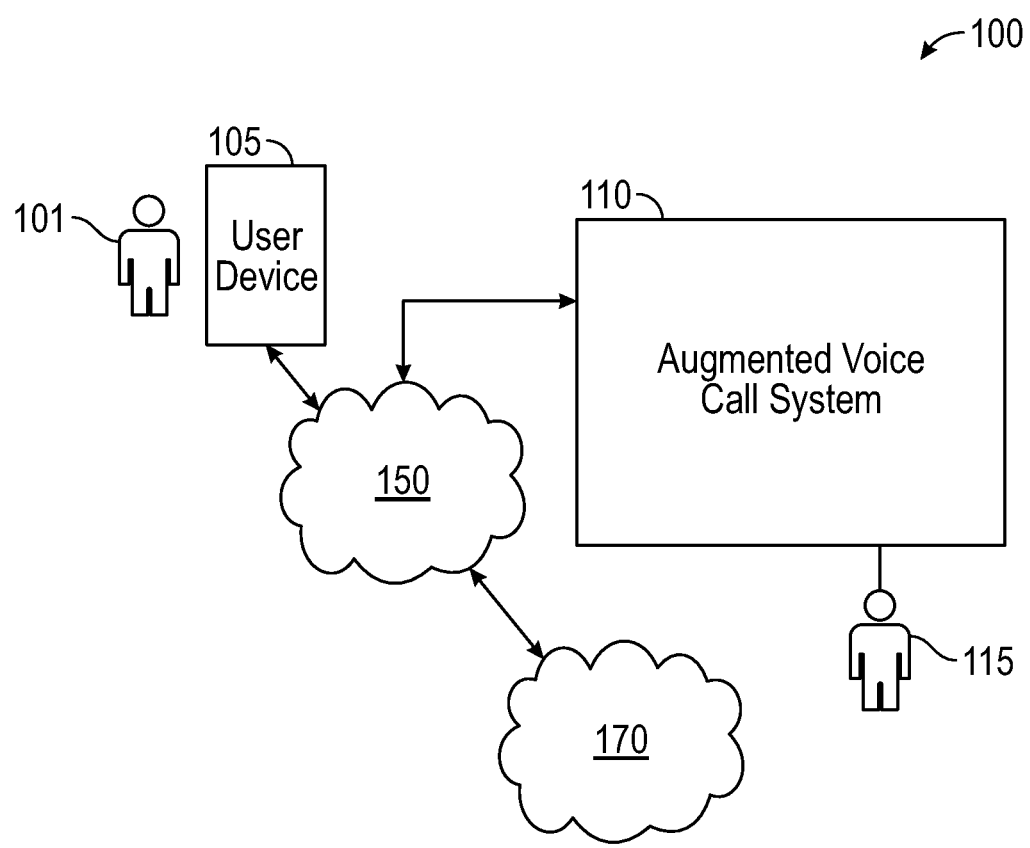
FIG. 1 illustrates an exemplary system to facilitate augmenting a voice call with a user interface, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

As described above, service phone calls are often directed first to an automated voice or touch tone based system to attempt to help a caller navigate through a system to access resources and/or answer questions prior to connecting the caller to a live human operator or service agent. While the automated systems can sometimes provide information and help a solve a problem, these automated voice based systems also often frustrate a caller for various reasons, including not solving the inquiry from the caller and going in loops to try to access the system.

The methods and systems described herein provide a way to both reduce caller frustration during a voice call session while also increasing the probability that the caller will solve their problem without intervention from or need to wait for a live human operator. The reduce frustration and increased performance of the system is accomplished by receiving information such as a spoken language string from a caller, determining at least one keyword from the spoken language string, generating a graphical user interface, and providing and guiding the user through the graphical user interface during the voice call session as described in relation to FIGS. 1-6 herein.

FIG. 1 illustrates an exemplary system to facilitate augmenting a voice call with a user interface, according to one embodiment. The system 100 includes a user 101 who interacts with a user device 105 and an augmented voice call system 110 via the user device 105. In some examples, the user device 105 is computing device which allows for a user to interact with the device through a graphical user interface. The user 101 may interact with the user device 105 via various types of output displays (e.g., display screens) and input devices (e.g. touch screen, keyboard, etc.). The computing device may also include mobile computing devices such as a smartphone. In one embodiment, the computing device may execute a user interface application that directly connects with the augmented voice call system 110 to receive and display user interfaces generated by the system 110 including user interface components on the user device 105. The user device 105 is described in more detail in relation to FIGS. 2A-2D.

The user device 105 communicates/interacts with the augmented voice call system 110 via a network 150. The network 150 may include one or more networks of various types, including a local area or local access network (LAN), a general wide area network (WAN), a public network (e.g., the Internet), and/or one or more mobile cell networks. In one embodiment, various networked computing devices of the system 100 are interconnected using the network 150, and one or more computing devices (e.g., system 110, user device 105, cloud computing model 170) including connections to the Internet.

The augmented voice call system 110 may include various components to facilitate the functions of the system as described herein. For example, the system 110 receives a voice call session request from the user device 105 when the user desires to place a call and determines whether to initiate the voice call session or provide the user 101 with a pre-call user interface via the user device 105 as described in more detail in relation to blocks 301-302 of FIG. 3.

In some examples, as the voice call session with the user 101 via the user device 105 is established, the system 110 receives various inputs from the user, including spoken words and other information. The system 110 uses the received inputs to determine and generate a user interface with a guided solution which may be display to the user 101 via displays of the user device 105 as described in relation to FIGS. 2A-2D.

Figure 2A:
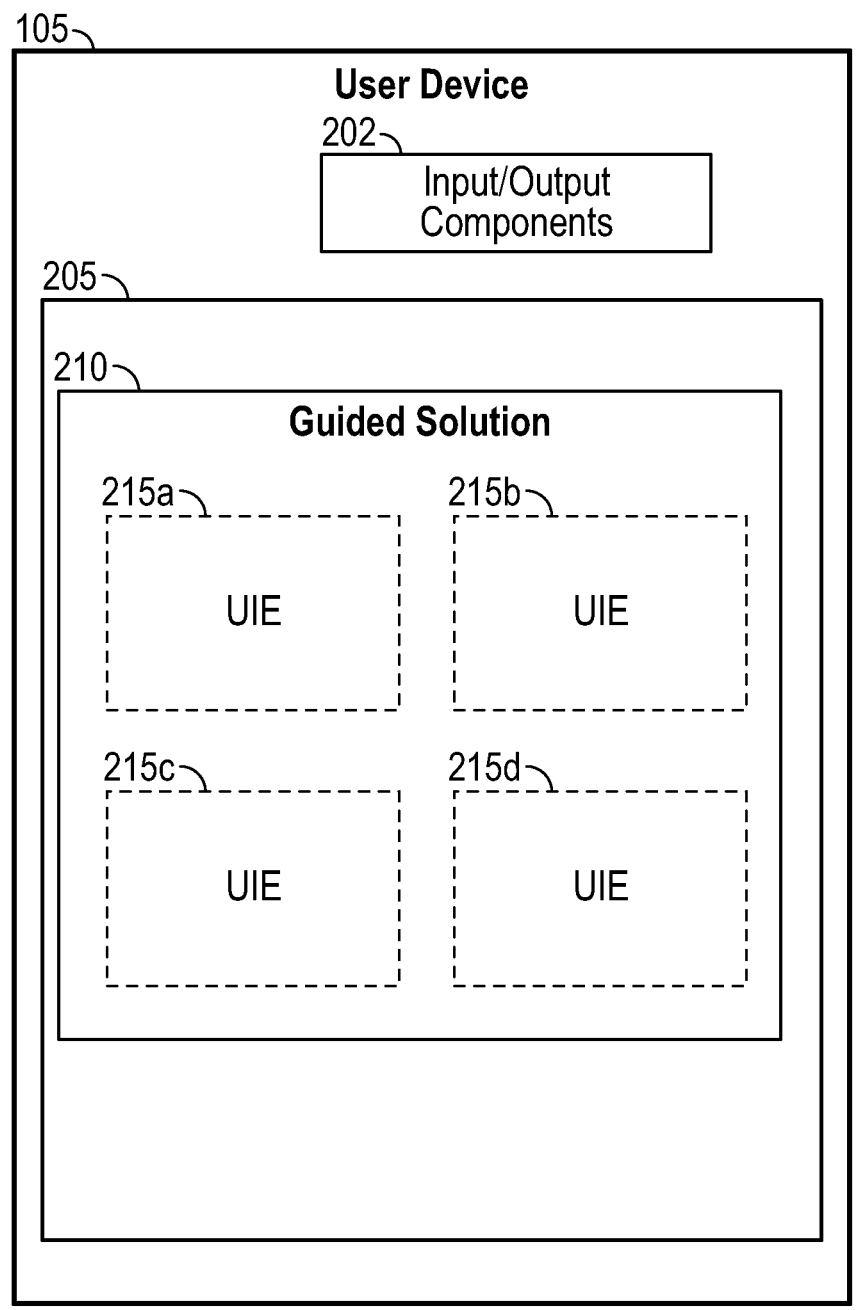
FIGS. 2A-D illustrate exemplary user devices and user interfaces, according to various embodiments.

FIG. 2A illustrates an example user device 105 and user interface display 205 displaying a guided solution 210, according to one embodiment. The user interface displayed on the user interface display 205 and the guided solution 210 are generated by the system 110 and provided to the user device 105 during a voice call session in order to augment the voice call session and provide the user a graphical method to access system resources of the system 110. As shown, the guided solution 210 includes various user interface elements (UIEs) including UIEs 215a-215d. In some examples, the UIEs 215a-215d are graphical interactive components that provide the user with solutions and/or options to proceed through a guided solution.

For example, during a troubleshooting voice call session, the UIEs 215a-215d and the guided solution 210 show the user 101 various solutions to a given problem and/or guide the user 101 through various steps to solve the given problem. In another example, such as a user 101 accessing various services of the system 110, the UIEs 215a-215d provide interfaces to access the services provided by the system 110. For example, the user 101 can access an account or other type of service provided by the system 110.

In some examples, the user 101 also interacts with the display 205 and other input/output components, such as input/output components 202 to interact with the guided solution and user interface provide by the system 110. In some examples, the input/output components 202 include sound based components (e.g., microphones, speakers, etc.), touch based components (e.g., keyboard, buttons, haptic sensors, etc.), and other visual/image based components (e.g., a camera, display, lights, etc.). In some examples, the visual/image based components can be utilized by the user device 105 and the system 110 to provide augmented reality images such as described in FIG. 2B.

Figure 2B:
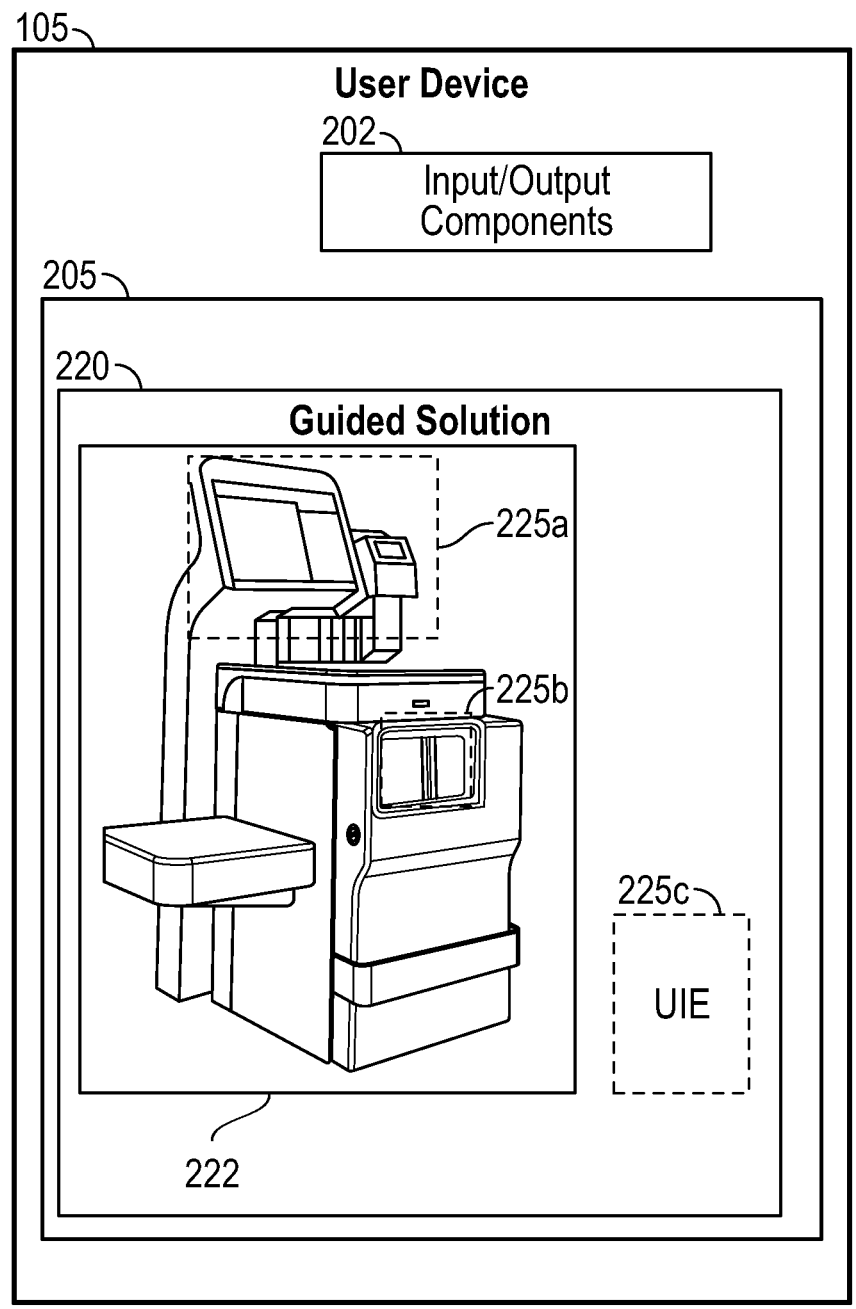

FIG. 2B illustrates an example user device 105 and user interface display 205, which includes an augmented reality interface, displaying a guided solution 220 with an augmented reality image 222, according to one embodiment. The user interface displayed on the display 205 and the guided solution 220 are generated by the system 110 and provided to the user device 105 during a voice call session to augment the voice call session. In some examples, the image 222 is also provided by the user device 105 and can be captured by the input/output components 202 on the user device 105 prior to being transmitted or provided to the system 110. As shown, the guided solution 210 includes various UIEs 225a-225b which are provided as augmented reality elements on the image 222. For example, the UIEs 225a-225b may provide an interactive or instructional information related to various objects identified in the image 222. In some examples, the guided solution 220 also includes UIE 225a that provide the user with solutions and/or options to proceed through a guided solution and interact with the augmented image 222.

For example, for a troubleshooting voice call session, the UIEs 225a-225c and the guided solution 220 show the user 101 various solutions to a given problem in the three dimensional space around the user (which is captured using one or more cameras in the user device 105) and/or guide the user 101 on how to interact with the objects identified in the image 222. In some examples, the image 222 and the various UIEs in the guided solution are updated as the user 101 interacts with the guided solution 220 on the user device 105.

Figure 2C:
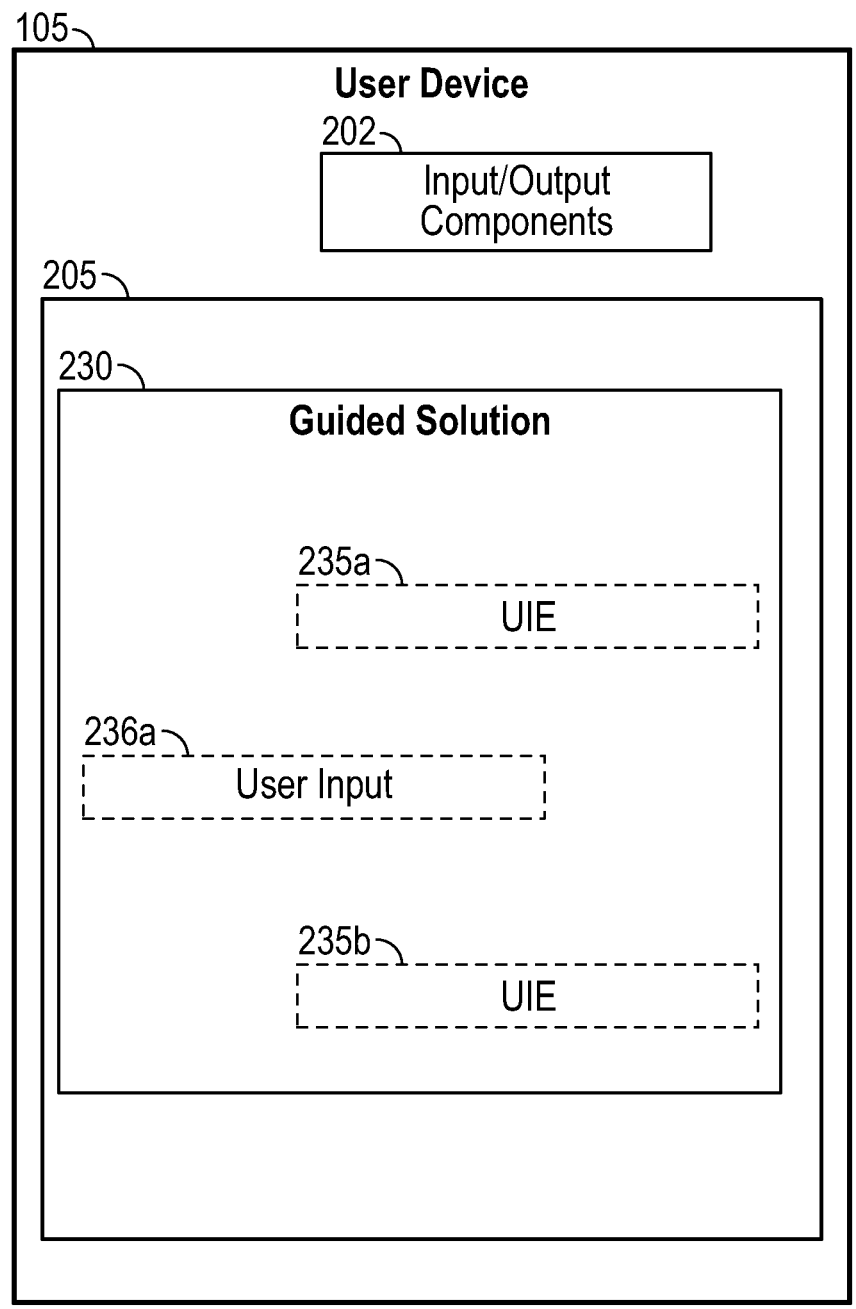

While shown as interactive visual object in FIGS. 2A-2B, the UIEs associated with the various guided solutions may also be text based UIEs. FIG. 2C illustrates an example user device 105 and user interface display 205 displaying a guided solution 230, according to one embodiment. User interfaces displayed on the 205 display and the guided solution 230 are generated by the system 110 and provided to the user device 105 during a voice call session to augment the voice call session. As shown, the guided solution 230 includes various text based UIEs, including UIEs 235a-235b. In some examples, the UIEs 235a-b are text based components that provide the user with solutions and/or options to proceed through the guided solution 230.

For example, for a troubleshooting voice call session, the UIEs 235a-235b and the guided solution 210 show the user 101 various solutions to a given problem or guided the user 101 to various steps to take to solve the given problem. In some examples, the user 101 interacts with the display 205 and other input/output components, such as input/output components 202 to provide inputs which may include text based inputs such as user input 236a which is provided to the system 110 and allows the system 110 to update the guided solution 230 and provide the updated solution (including the UIE 235b) to the user via the user device 105.

Figure 2D:
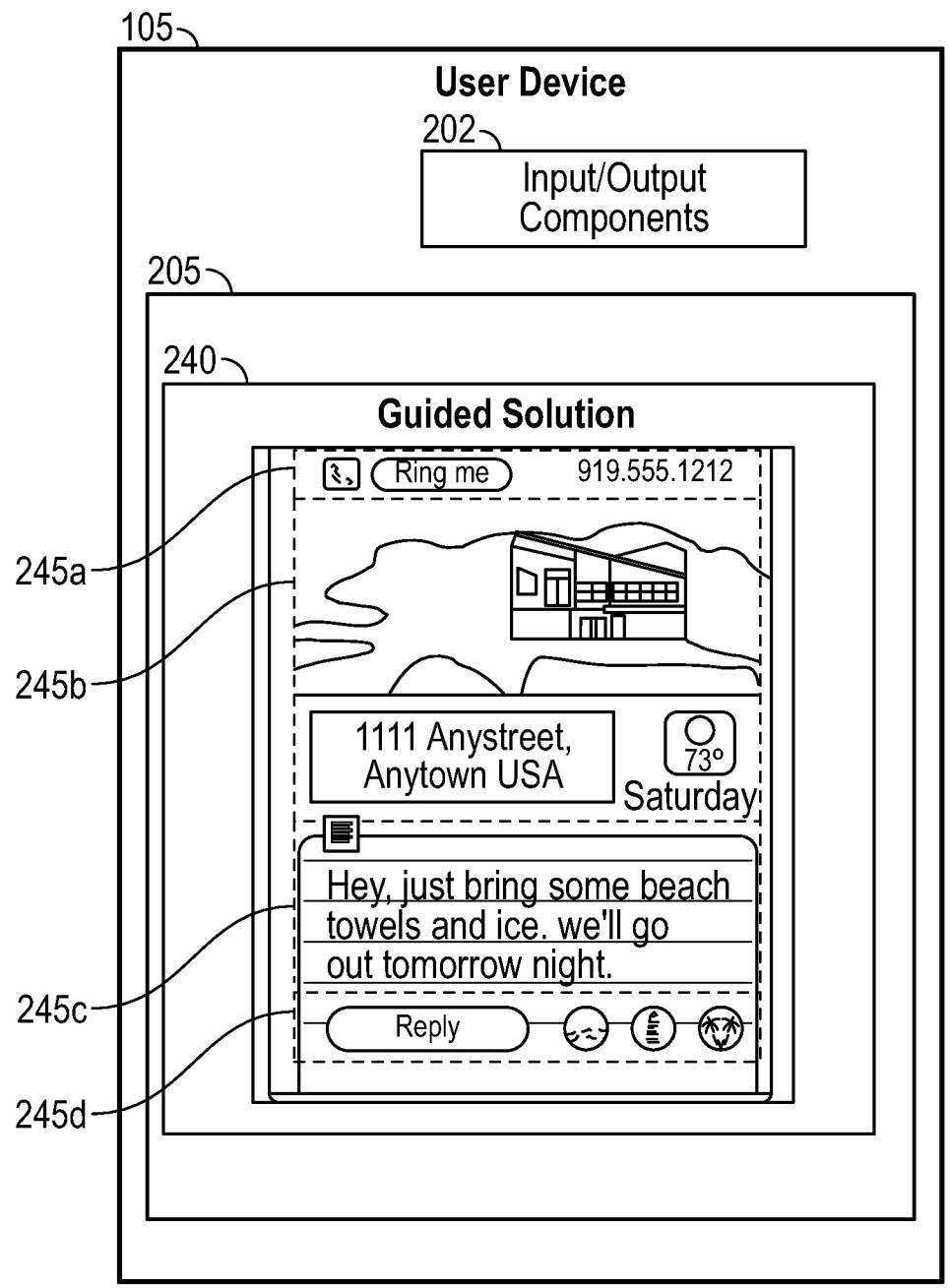

FIG. 2D illustrates an example user device 105 and user interface display 205 displaying a guided solution 240, according to one embodiment. In some examples, the user interface and the guided solution 240 are generated by the system 110 and displayed on the display 205 of the user device 105 prior to the initiation of a voice call, such as receiving an initial call request. In some examples, the guided solution 240 includes UIEs 245a-245d which are configured to provide a user with a guided solution prior to the initiation of a voice call session. In some examples, a UIE, such as the UIE 245a also allows for a user to initiate the voice call session through the guided solution 240.

For example, during a troubleshooting voice call session, the UIEs 215a-215d and the guided solution 210 show the user 101 various solutions to a given problem or guide the user 101 to various steps to take to solve the given problem. In another example, such as a user 101 accessing various services of the system 110, the UIEs 215a-215d provide interfaces to access the services. For example, the user 101 can access an account or other type of service provided by the system 110 prior to initiating a call. Each of the various embodiments described in FIGS. 2A-2D are described in greater detail in relation to the methods described in FIGS. 3-4B.

Figure 3:
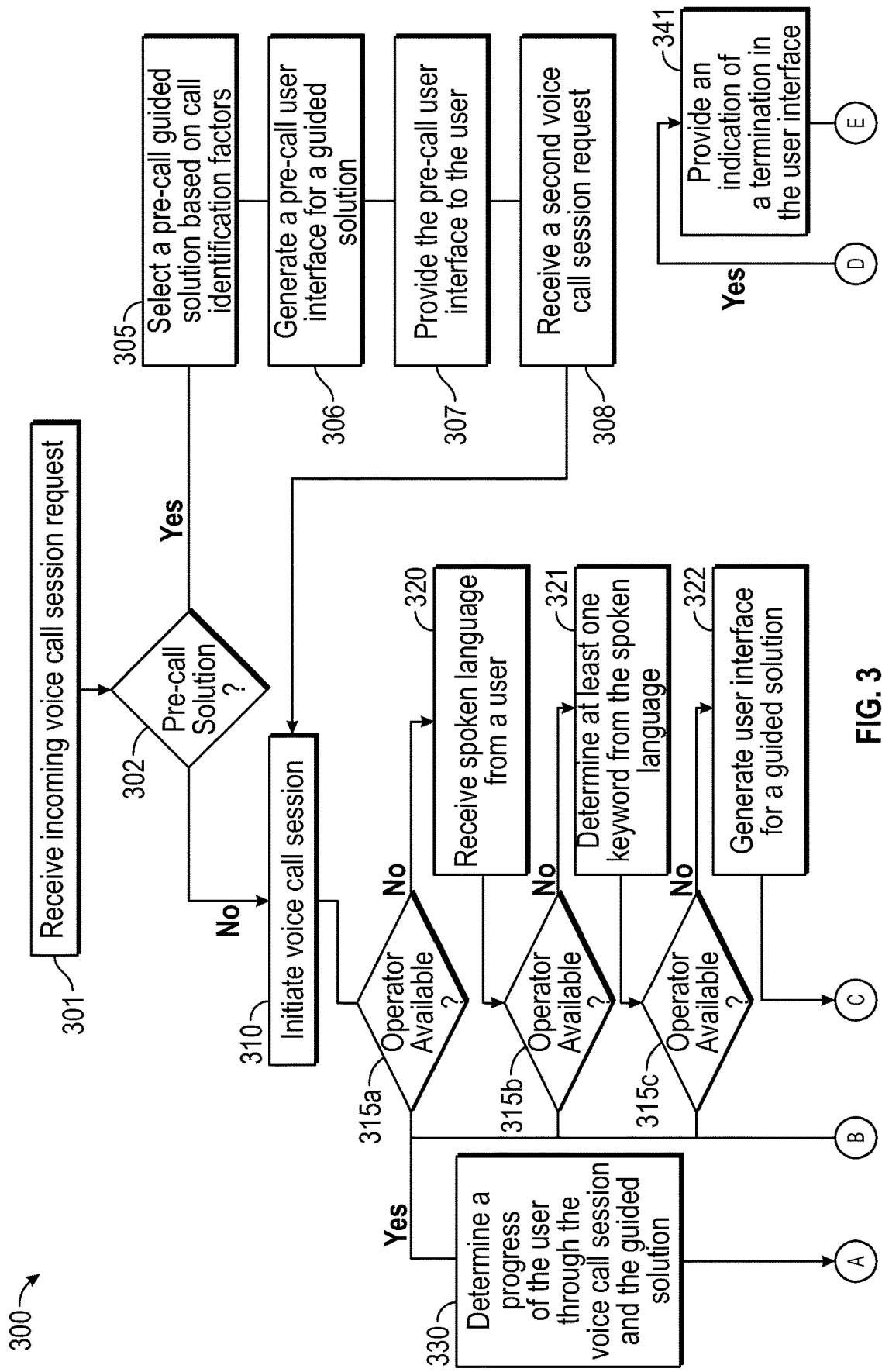
FIG. 3 illustrates a method to provide a user interface to a user, according to one embodiment.
Figure 3:
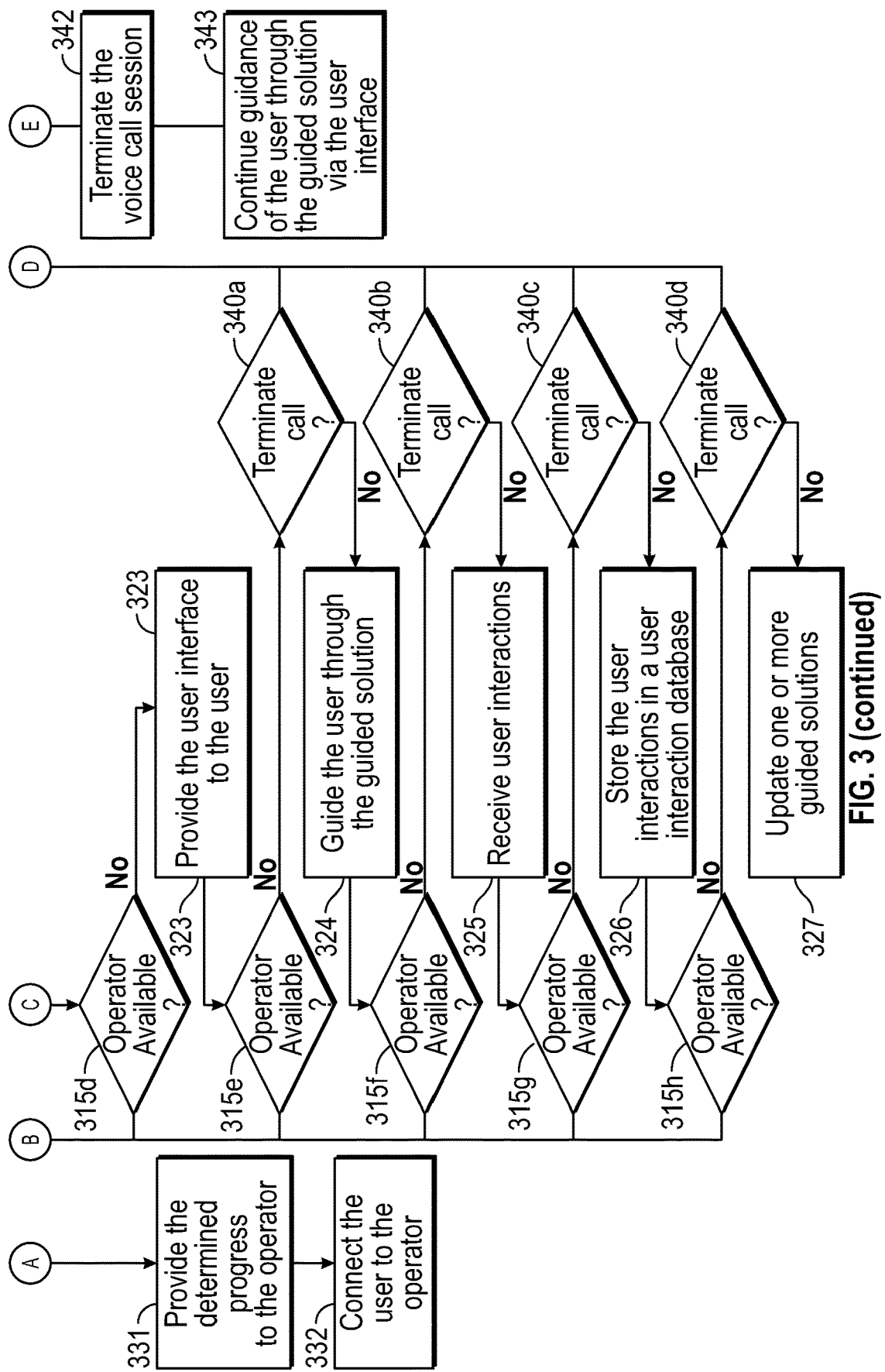

FIG. 3 illustrates a method 300 to provide a user interface to a user, according to one embodiment. In some examples, the method 300 is performed by the augmented voice call system 110 in communication with the user 101 via the user device 105 and the operator 115 which may interface directly with the system 110 or via an operator device, such as described in FIG. 5. Method 300 begins a block 301 where the system 110 receives an incoming voice call session request. For example, the user 101 via the user device 105 places a phone call to access the system 110 where the system 110 receives the incoming call as the voice call session request.

At block 302 the system 110 determines, based on call identification factors in the voice call session request, whether a pre-call guided solution is available. In some examples, the call identification factors include a phone number associated with the user device 105 and/or other information received in addition to the reception of the phone number. For example, other information identifying the user device 105 and/or the user 101 may be used by the system 110 to determine whether a pre-call guided solution is available.

One example pre-call guided solution may include a custom guided solution created for the user 101 or a class of users that includes the user 101. For example, in an example where the system 110 is a personal system (e.g., managed by an individual for personal use), the operator 115 (e.g., the managing individual) may identify a set of users that are directed to a guided solution such as the guided solution 240. In this example, the operator 115 may provide information and assist the user with an inquiry or request without beginning a phone call. For example, the user 101 places a call to an individual such as the operator 115 requesting information from the operator 115. To streamline answering the inquiry or request the operator 105 may set up or configure a guided solution, such as guided solution 240, to provide information, answers, and or solutions to the user 101's request without the need to answer the call. When the call identification factors indicate a pre-call guided solution is available the method 300 proceeds to block 305.

At block 305, the system 110 selects a pre-call guided solution based on call identification factors from a repository in the system 110. For example, as described above, the operator 115 configures or set a pre-call guided solution for the user 101 or a class of users so that when a call request is received the user 101 is provided the pre-call guided solution. The system 110 uses the identification information in the identification factors to select the pre-call guided solution, such as the guided solution 240.

At block 306, the system 110 generates a pre-call user interface including at least one pre-call user interface element using the pre-call guided solution. In some examples, the system 110 generates the pre-call user interface based on the identification information and other information from the user device 105. For example if the user device 105 generates the user interface based on whether the user device 105 supports a displayable user interface, the device is text based, and/or the user device uses an application on the user device 105 configured to display a user interface/guided solution from the system 110.

At block 307, the system 110 provides the pre-call user interface to the user prior to initiating the voice call session. For example, the system 110 transmits the pre-call user interface including the pre-call guided solution and any UIEs in the pre-call guided solution to the user device 105, which causes the user device 105 to display the user interface and the pre-call guided user solution.

For example, the guided solution 240 shown in FIG. 2D is for a group trip organized by the operator 115. In this example, the operator 115 sets a class of users that are also going on the trip to be provided the pre-call guided solution. For example, the operator 115 may include trip details such as time, place, cost, supplies needed, etc. in the UIEs in the pre-call guided solution so that when the user 101 calls to inquire about those details and/or volunteer to provide certain supplies the user 101 is guided first to the pre-call user interface prior to being connected to the system 110 and the operator 115 via a voice call.

In another example, the user 101 may be a customer or client of a company managing the system 110. For example, the user 101 may be a customer of a bank where when the user 101 calls system 110 and the pre-call guided solution provides a summary of accounts or answers to common questions, etc.

While the pre-call guided solutions are meant to answer inquires prior to a call being connected, in any pre-call guided solution, the user 101 may still desire to talk to an operator. To address this, one example UIE in the user interface, e.g., UIE 245a, may include an option to continue with the voice call request or connect the call. In an example, where the user 101 desires to connect a call, the method 300 proceeds to block 308 where the system 110 receives a second voice call session request (e.g., the user selects UIE 245a) and proceeds to block 310.

Returning back to block 302, when a pre-call guided solution is not available the method 300 proceeds from block 302 to block 310. At block 310 the system 110 initiates a voice call session. For example, the user 101 is connected to an automated call answering system in the system 110 which receives and answers calls and guides a user through an automated voice based phone call system. In some examples, as the voice call is proceeding through the blocks 320-327, the system 110 determines whether an operator for the voice call session is available at blocks 315a-315h. For example, when a live customer service agent is available to answer the call in the voice call session, the method 300 proceeds to block 330. While shown as checks between each step of the blocks 320-327, the determination of whether an operator is available may also be made independently of the method 300, where the system 110 interrupts the process of the method 300 to proceed to blocks 330-332.

At block 330, the system 110 determines a progress of the user through the voice call session and the guided solution. For example, the system 110 determines what inputs the user has provided to the system 110 either via the voice call session, a user interface provided to the user, and a provided guided solution. In some examples, the determination includes a progress of the user 101 through a guided solution etc. For example, what steps the user has already tried to solve a given problem and/or what system resources the user has already accessed.

At block 331, the system 110 provides the determined progress to the operator and connects the user to the operator at block 332. The determined progress provides context for the operator 115 to assist the user 101 with a better understanding of the user inquiry or purpose of the call and what steps the user has accomplished in solving the inquiry via the voice call and provided user interface.

Returning back to blocks 315a-h, when an operator is not currently available, the system 110 proceeds through method 300 blocks 320-327. At block 320, the system 110 receives, during the voice call session, a spoken language string from a user. For example, the user describes their problem or inquiry to an automated voice answering service on the system 110 and the system 110 records the spoken language string and/or determines keywords or other information from the spoken language string as described in block 321. In some examples, other inputs may also be received from the user 101 such as touch-tone phone inputs and other information that may be used to determine keywords.

At block 321, the system 110 determines at least one keyword from the spoken language string. For example, the system 110 uses voice processing processes to parse the spoken language string and determine keywords from the parsed spoken language string. For example, when the user 101 is troubleshooting a problem, the keywords may include an identification of the problem. When the user is attempting to access system resources (e.g., accounts, etc.) the keywords may include keywords related to the various system resources.

At block 322, the system 110 generates a user interface comprising at least one user interface element for a guided solution for the voice call session based on the at least one keyword. In some examples, the system 110 selects a guided solution from a guided solution database based on the one or more keywords determined at block 321. For example, the guided solution may provide troubleshooting steps, access to information, and other resources for the user's voice call session. In some examples, the guided solution includes various UIEs that are to be included in the user interface, such as visual representations of troubleshooting steps, etc.

The user interface may also generate one or more UIEs as shown and discussed in relation to FIGS. 2A-2D that the user to interact with the guided solution while the user interface is displayed. In some examples, the user device 105 generates the user interface based on whether the user device 105 supports a displayable user interface, the device is text based, and/or the user device 105 has an application for displaying a user interface/guided solution provided by the system 110. The user interface may also include augmented reality images as discussed in relation to FIG. 4A and may be displayed on a dedicated application on the user device 105 as discussed in relation to FIG. 4B.

At block 323 the system 110 provides the user interface to the user to augment the voice call session and at block 324 the system guides the user through the guided solution via the voice call session and the user interface. In some examples, providing the user interface to the user includes transmitting the information to the user device 105 which causes the user device 105 to display the user interface to the user 101. The user interface may be displayed with graphical UIEs, augmented reality images, and/or as a text based user interface as shown in FIGS. 2A-2D. In some examples, guiding the user through the guided solution includes receiving user interactions via the user device 105 and providing updated UIEs and other information to the user through an updated user interface provided to the user and/or via information sent through the voice call session.

At block 325, while the system 110 guides the user through the guided solution, the system 110 also receives a plurality of user interactions via the voice call session and the user interface. For example, the system 110 receives additional spoken word strings from the voice call session and/or interactions with the UIEs and the guided solution including actions the user is taking within the guided solution.

At block 326 the system 110 stores the plurality of user interactions in a user interaction database and updates one or more guided solutions based on the plurality of user interactions in the user interaction database at block 327. For example, the system stores the user interactions with the system 110 and the user interface on the device 105 to update various guided solutions and provide insight into the various ways users interact with the guided solutions. In one example, machine learning processes are used to determine various ways users interact with the system 110 in the voice call session and the guided solutions and updates the stored guided solutions to increase efficiencies and improve the guided solutions.

In some examples, when a user interface and guided solution are provided to a user, the user may no longer need to continue the voice call session (e.g., has acquired the information needed, a method to access the information, and/or does not need to speak with an operator). In some examples, as the user interface is provided to the user at blocks 323-327, the system 110 also performs a call termination check at blocks 340a-340d.

For example, at blocks 340a-340d the system 110 determines whether the voice call session may be terminated based on a variety of factors such as whether the guided solution can answer the user's request/inquiry or whether the user can be guided through the solution without further need of the voice call session and/or an operator. When the call is terminated, the method 300 proceeds to block 341 where the system 110 provides an indication of a termination in the user interface and terminates the voice call session at block 342. For example, a UIE indicating that the call is to be terminated is provided to the user via the user interface displayed on the user device 105. A block 343, the system 110 continues to guide the user through the guided solution via the user interface, such as receiving inputs from the user via the user device 105, updating the guided solutions, UIEs, and the user interface provided to the user.

Figure 4A:
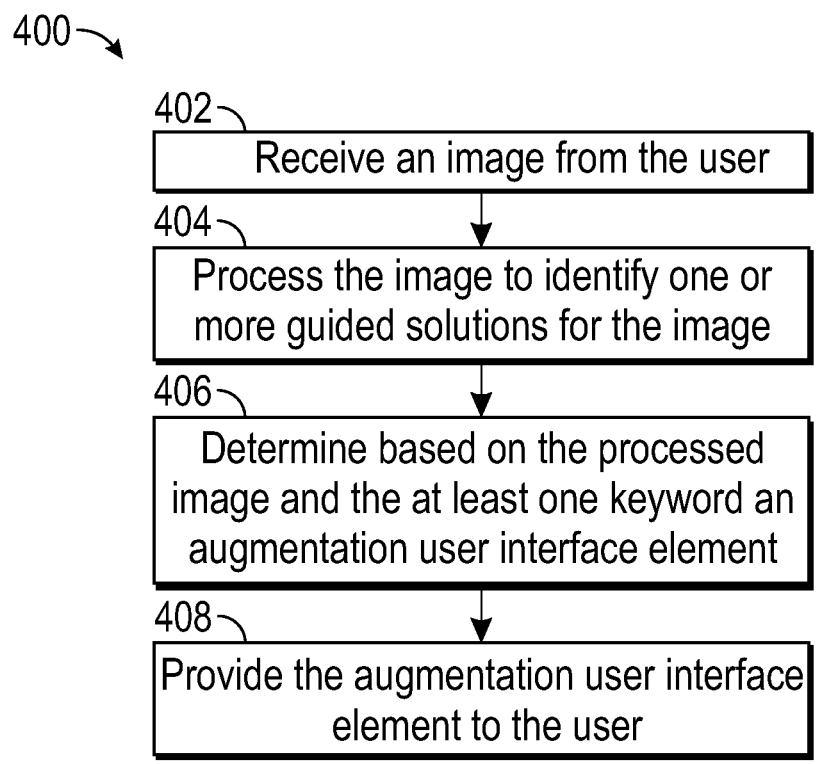
FIG. 4A-B illustrate methods to provide a user interface to a user device, according to one embodiment.
Figure 4B:
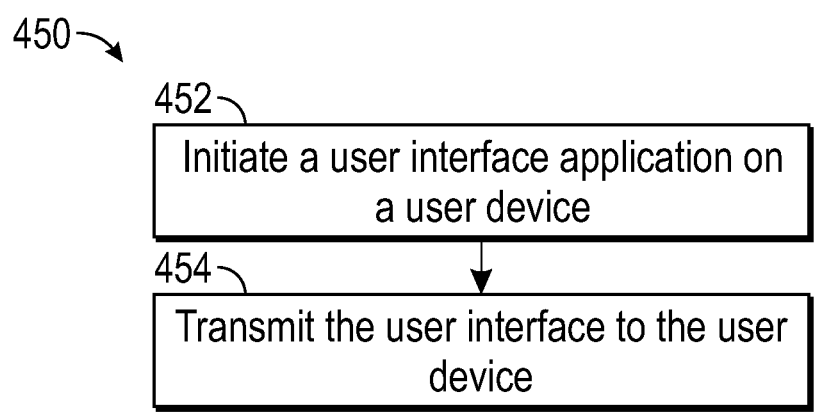

FIG. 4A-B illustrate methods to provide a user interface to a user device, according to one embodiment. Method 400 in FIG. 4A is a method for providing an augmented reality user interface to a user as described in relation to FIG. 2B. Method 400 begins at block 402 where the system 110 receives an image from the user 101 such as via a camera or other visual image system on the user device 105. In some examples, the image is a real time image of the environment around the user 101.

At block 404, the system 110 processes the image to identify one or more guided solutions for the image. In some examples, a guided solution may already be selected and the processed image is used to select various UIEs from the selected guided solution or additional guided solutions that may be used to augment the image.

At block 406, the system 110 determines based on the processed image and the at least one keyword an augmentation user interface element to augment the image from the user. For example, the system 110 uses the keyword from the parsed spoken language, guided solutions, and other information to generate an augmentation user interface element such as the UIEs 225a-225b to augment the received image.

At block 408, the system provides the augmentation user interface element to the user by updating the generated user interface with the image and the augmentation user interface element such as shown in FIG. 2B. For example, the system 110 provides the user interface with augmented image to the user device 105 which displays the augmented reality image to the user.

Method 450 in FIG. 4B is a method for providing a user interface to a user via a user interface application. In some examples, the entity managing the system 110 may also provide a specific application installed on the user device 105 which can display a user interface on the user device. In this example, the system 110 may have greater access to the user interactions with the user interface displayed on the device 105 as well as allow for enriched user interface experiences. Method 400 begins at block 452, where the system initiates a user interface application on a user device. In this example, the system 110 may transmit a signal to start the application on the user device 105 and/or prepare the application to display a generate user interface.

At block 454, the system 110 transmits the user interface to the user device, where transmitting the user interface to the user device causes the user device to render the user interface and the at least one user interface element on a display of the user device within the specific application. In some examples, any of the generates user interfaces described in relation to FIGS. 2A-2D, FIG. 3, and FIG. 4A may be transmitted to the user device 105 to be displayed via the specific application.

Figure 5:
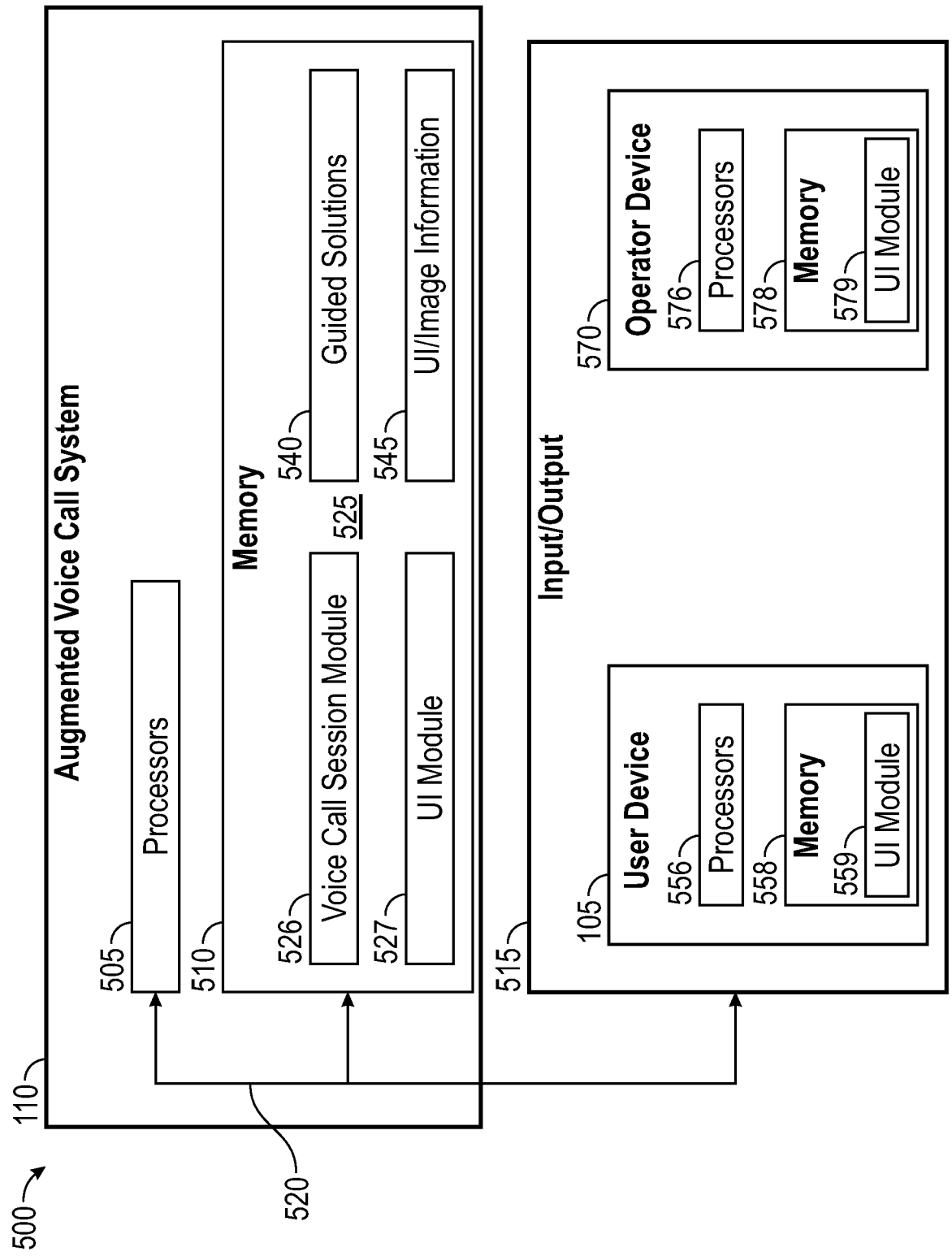
FIG. 5 is a block diagram of a system to facilitate augmenting a voice call with a user interface, according to one embodiment.

FIG. 5 is a block diagram illustrating an augmented voice call system, according to one embodiment. Specifically, the arrangement 500 illustrates exemplary operation of the system 100. Arrangement 500 includes a number of processors 505, memory 510, and input/output 515, which are interconnected using one or more connections 520. In one embodiment, the arrangement 500 may be implemented as a singular computing device and connection 520 may represent a common bus. In other embodiments, arrangement 500 is distributed and includes a plurality of discrete computing devices that are connected through wired or wireless networking such as the network 150. The processors 505 may include any processing element suitable for performing functions described herein, and may include single or multiple core processors, as well as combinations thereof. Processors 505 may be included in a single computing device, or may represent an aggregation of processing elements included across a number of networked devices such as personal devices, including the user device 105, etc. Similarly, the processors 556 located in user device 105 and the processors 576 located in the operator device 570 may include any processing element suitable for performing functions described herein, and may include single or multiple core processors, as well as combinations thereof.

Memory 510 (and memory 558 and 576) may include a variety of computer-readable media selected for their size, relative performance, or other capabilities: volatile and/or non-volatile media, removable and/or non-removable media, etc. Memory 510 may include cache, random access memory (RAM), storage, etc. Storage included as part of memory 510 may typically provide a non-volatile memory for the networked computing devices, and may include one or more different storage elements such as Flash memory, a hard disk drive, a solid state drive, an optical storage device, and/or a magnetic storage device. Memory 510 may be included in a single computing device or may represent an aggregation of memory included in networked devices. Memory 510 may include a plurality of modules 525 for performing various functions described herein. The modules 525 generally include program code that is executable by one or more of the processors 505.

As shown, modules 525 include voice call session module and UI module 527. In some examples, the UI module 527 may use artificial intelligence (AI), machine learning, deep learning, neural networks and/or other data analytics systems to generate and/or update guided solutions in the memory 510. In some examples, AI systems may use proprietary models, publicly available models, and/or a combination of both to update the guided solutions.

The modules 525 may also interact to perform certain functions. For example, voice call session module 526 during operation may make calls to the UI module 527, and so forth. The person of ordinary skill will recognize that the modules provided here are merely non-exclusive examples; different functions and/or groupings of functions may be included as desired to suitably operate the environment. Memory 510 may also include guided solutions 540 and UI/Image information 545. In one embodiment, the guided solutions 540 and UI/Image information 545 may be stored on the system 110 or on a separate database.

I/O 515 includes the user device 105 and operator device 570 and may further include input devices (not illustrated) and output devices that may be included to enhance the experience for persons interacting with the system 110. In some embodiments, user device 105 and operator device 570 may include output devices such as visual devices (e.g., visual displays, indicators) and/or audio devices (e.g., speakers) for communicating with persons during their interactions with the devices and the system 110. The input devices include suitable devices capable of receiving input from persons, such as cameras, keyboards or keypads, touchscreens, buttons, inertial sensors, etc. I/O 515 may further include wired or wireless connections to an external network (e.g., network 170) using I/O adapter circuitry.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., system 110) or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving, during a voice call session with a voice call system, a spoken language string from a user via the voice call session, wherein the voice call system provides ongoing automated voice based guidance to the user during voice call session;
   generating, at the voice call system, a user interface comprising at least one user interface element for a guided solution for the voice call session based on the spoken language string;
   providing, during the voice call session, the user interface to a user device for display in order to augment the voice call session, wherein the user device is associated with the user; and
   guiding the user through the guided solution via the voice call session and the user interface.

2. The method of claim 1, further comprising:
   receiving a plurality of user interactions via the voice call session and the user interface;
   storing the plurality of user interactions in a user interaction database; and
   updating one or more guided solutions based on the plurality of user interactions in the user interaction database.

3. The method of claim 1, further comprising:
   determining an operator for the voice call session is available;
   determining a progress of the user through the voice call session and the guided solution; and
   providing the determined progress to the operator; and
   connecting the user to the operator.

4. The method of claim 1, wherein the user interface comprises an augmented reality interface and wherein generating the user interface further comprises:
   receiving an image from the user;
   processing the image to identify one or more guided solutions for the image;
   determining based on the processed image and the spoken language string an augmentation user interface element to augment the image from the user; and
   providing the augmentation user interface element to the user.

5. The method of claim 1, wherein providing the user interface to the user comprises:
   initiating a user interface application on a user device; and
   transmitting the user interface to the user device, wherein transmitting the user interface to the user device causes the user device to render the user interface and the at least one user interface element on a display of the user device.

6. The method of claim 1, further comprising:
   determining the voice call session may be terminated;
   providing an indication of a termination in the user interface;
   terminating the voice call session; and
   continuing guidance of the user through the guided solution via the user interface.

7. The method of claim 1, further comprising:
   receiving a voice call session request from the user;
   prior to an initiation of the voice call session, determining, based on call identification factors in the voice call session request, a pre-call guided solution is available;
   selecting the pre-call guided solution based on call identification factors;
   generating a pre-call user interface comprising at least one pre-call user interface element using the pre-call guided solution; and
   providing the pre-call user interface to the user prior to initiating the voice call session.

8. A system comprising:
   one or more computer processors;
   a memory containing program code which, when executed by the one or more computer processors, performs an operation comprising:
      receiving, during a voice call session with the system, a spoken language string from a user via the voice call session, wherein the voice call system provides ongoing automated voice based guidance to the user during voice call session;
      generating, at the system, a user interface comprising at least one user interface element for a guided solution for the voice call session based on the spoken language string;
      providing, during the voice call session, the user interface to a user device for display in order to augment the voice call session, wherein the user device is associated with the user; and
      guiding the user through the guided solution via the voice call session and the user interface.

9. The system of claim 8, wherein the operation further includes:
   receiving a plurality of user interactions via the voice call session and the user interface;

storing the plurality of user interactions in a user interaction database; and updating one or more guided solutions based on the plurality of user interactions in the user interaction database.

10. The system of claim 8, wherein the operation further includes:

determining an operator for the voice call session is available;

determining a progress of the user through the voice call session and the guided solution; and providing the determined progress to the operator; and connecting the user to the operator.

11. The system of claim 8, wherein the user interface comprises an augmented reality interface and wherein generating the user interface further comprises:

receiving an image from the user;

processing the image to identify one or more guided solutions for the image;

determining based on the processed image and the spoken language string an augmentation user interface element to augment the image from the user; and providing the augmentation user interface element to the user.

12. The system of claim 8, wherein providing the user interface to the user comprises:

initiating a user interface application on a user device; and transmitting the user interface to the user device, wherein transmitting the user interface to the user device causes the user device to render the user interface and the at least one user interface element on a display of the user device.

13. The system of claim 8, wherein the operation further includes:

determining the voice call session may be terminated;

providing an indication of a termination in the user interface;

terminating the voice call session; and continuing guidance of the user through the guided solution via the user interface.

14. The system of claim 8, wherein the operation further includes:

receiving a voice call session request from the user;

prior to an initiation of the voice call session, determining, based on call identification factors in the voice call session request, a pre-call guided solution is available;

selecting the pre-call guided solution based on call identification factors;

generating a pre-call user interface comprising at least one pre-call user interface element using the pre-call guided solution; and providing the pre-call user interface to the user prior to initiating the voice call session.

15. A computer program product comprising:

a computer-readable storage medium having computer-readable program code embodied therewith, the computer-readable program code executable by one or more computer processors to perform an operation that includes:

receiving, during a voice call session with a voice call system, a spoken language string from a user via the voice call session, wherein the voice call system provides ongoing automated voice based guidance to the user during voice call session;

generating, at the voice call system, a user interface comprising at least one user interface element for a guided solution for the voice call session based on the spoken language string;

providing, during the voice call session, the user interface to a user device for display in order to augment the voice call session, wherein the user device is associated with the user; and guiding the user through the guided solution via the voice call session and the user interface.

16. The computer program product of claim 15, wherein the operation further includes:

receiving a plurality of user interactions via the voice call session and the user interface;

storing the plurality of user interactions in a user interaction database; and updating one or more guided solutions based on the plurality of user interactions in the user interaction database.

17. The computer program product of claim 15, wherein the operation further includes:

determining an operator for the voice call session is available;

determining a progress of the user through the voice call session and the guided solution; and providing the determined progress to the operator; and connecting the user to the operator.

18. The computer program product of claim 15, wherein the user interface comprises an augmented reality interface and wherein generating the user interface further comprises:

receiving an image from the user;

processing the image to identify one or more guided solutions for the image;

determining based on the processed image and the spoken language string an augmentation user interface element to augment the image from the user; and providing the augmentation user interface element to the user.

19. The computer program product of claim 15, wherein the operation further includes:

determining the voice call session may be terminated;

providing an indication of a termination in the user interface;

terminating the voice call session; and continuing guidance of the user through the guided solution via the user interface.

20. The computer program product of claim 15, wherein the operation further includes:

receiving a voice call session request from the user;

prior to an initiation of the voice call session, determining, based on call identification factors in the voice call session request, a pre-call guided solution is available;

selecting the pre-call guided solution based on call identification factors;

generating a pre-call user interface comprising at least one pre-call user interface element using the pre-call guided solution; and providing the pre-call user interface to the user prior to initiating the voice call session.

* * * * *